(No Model.)

W. C. & E. A. BENNETT.
WIRE GATE TIGHTENER.

No. 598,494. Patented Feb. 8, 1898.

WITNESSES
T. L. Mockabee
Ann Poynton

INVENTORS
William C Bennett and
Eratza N Bennett,
By John Wedderburn, Attorney

United States Patent Office.

WILLIAM C. BENNETT AND ERALZA A. BENNETT, OF SCHALLER, IOWA.

WIRE-GATE TIGHTENER.

SPECIFICATION forming part of Letters Patent No. 598,494, dated February 8, 1898.

Application filed January 27, 1897. Serial No. 620,918. (No model.)

*To all whom it may concern:*

Be it known that we, WILLIAM C. BENNETT and ERALZA A. BENNETT, citizens of the United States, residing at Schaller, in the county of Sac and State of Iowa, have invented certain new and useful Improvements in Wire-Gate Tighteners; and we do hereby declare the following to be a full, clear, and exact description of the invention, such as will enable others skilled in the art to which it appertains to make and use the same.

Our invention relates to wire-gate tighteners; and our object is the provision of improved, simple, and cheap means for tightening gates of this class quickly and easily; and the invention consists of certain improved features and novel combination of parts more fully described hereinafter.

Figure 1:
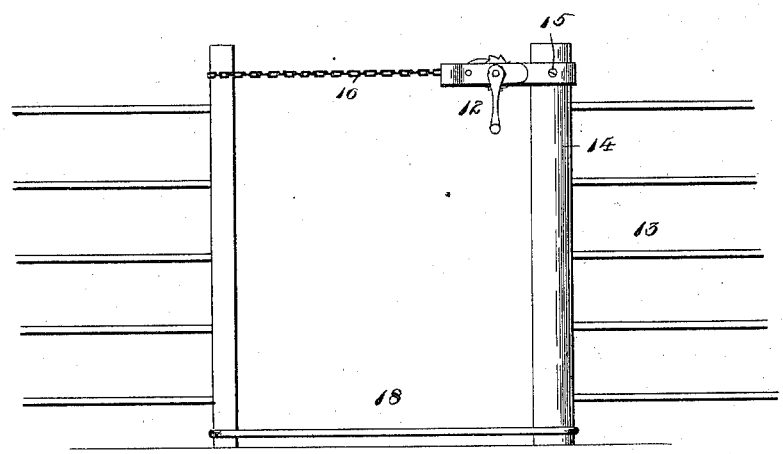
Figure 2:
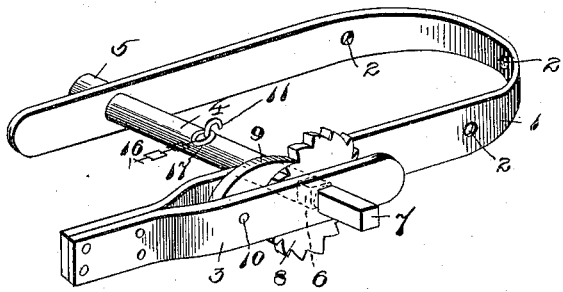

In the accompanying drawings, forming a part of this specification, Figure 1 is a view disclosing the device in use, and Fig. 2 is an enlarged detail view.

Referring now to Fig. 2, the numeral 1 designates a piece of strap-iron bent in the shape of a loop and provided with screw-holes 2. One part of this loop is extended farther than the other, and to it is connected a supplemental metal strap 3.

The numeral 4 designates a spindle which is journaled in the sides of the loop and the supplemental strap, said spindle having a head 5 at one end and being formed with squared portions 6 and 7 at its other end.

The numeral 8 designates a ratchet-wheel which is secured on the squared portion 6 and lies between the main loop and the supplemental strap.

The numeral 9 designates a pawl adapted to engage with the ratchet-wheel, said pawl being pivoted on a pin 10 and located between the loop and supplemental strap.

The numeral 11 designates a hook connected to the spindle.

At 12 we have shown a crank-handle adapted for reception on the squared end 7 of the spindle, whereby the latter may be turned. Reference is to be had to Fig. 1 for a disclosure of the device when in use. Here the gate is shown at 13 and the gate-post at 14. The loop is slipped over the gate-post and secured by screws 15, passed through the openings in said loop. A chain 16, connected to the fence, is provided with a ring 17, which is passed over the hook. When the crank is turned, the chain is wound around on the spindle and the gate is tightened, the pawl serving to prevent said spindle from turning backward. At the bottom of the gate-post there is located a wire loop 18, which is passed around said post and receives the post of the fence. With our device the gate can be kept in proper position at all times.

Having thus described our invention, what we claim as new, and desire to secure by Letters Patent, is—

The combination with a fence-post and a wire gate, of a U-shaped loop having screw-holes and adapted to be passed around the gate-post and secured thereto by screws passing through the holes, a supplemental piece connected to one arm of said loop and extending substantially parallel thereto, a round spindle journaled in the legs of the loop and in the supplemental piece, being provided with a head on one end and having a squared portion on the other end, a crank received on said squared portion, a hook projecting from the spindle intermediate of the legs of the loop, a chain engaged with said hook and connected to the fence-post, a ratchet-wheel secured to the spindle and located between the supplemental piece and the loop, a pawl pivoted between said supplemental piece and the loop and adapted to engage with the ratchet-wheel, and a wire loop passed around the bottom of the fence-post and which receives the gate-post.

In testimony whereof we have signed this specification in the presence of two subscribing witnesses.

WILLIAM C. BENNETT.
ERALZA A. BENNETT.

Witnesses:
F. C. HUDSON,
SAM MONTGOMERY.